United States Patent Office 3,758,499
Patented Sept. 11, 1973

3,758,499
HETEROCYCLIC NITRO-p-PHENYLENEDIAMINES
Milos S. Bil, Forest Hills, N.Y., assignor to Clairol Incorporated, New York, N.Y.
No Drawing. Original applications Nov. 2, 1967, Ser. No. 683,758, now abandoned, and Apr. 8, 1968, Ser. No. 719,682, now Patent No. 3,632,582. Divided and this application Nov. 25, 1970, Ser. No. 92,868
Int. Cl. C07d 27/04
U.S. Cl. 260—326.5 L    1 Claim

ABSTRACT OF THE DISCLOSURE

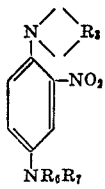

wherein:
(a) $R_3$ is a divalent aliphatic radical, and
(b) $R_6$ and $R_7$ are selected from the group consisting of hydrogen, alkyl and hydroxyalkyl, at least one of $R_6$ and $R_7$ being other than hydrogen.

DIVISIONAL APPLICATION

This application is a division of application Ser. No. 683,758 filed Nov. 2, 1967, now abandoned, and application Ser. No. 719,682 filed Apr. 8, 1968, now Pat. No. 3,632,582.

This invention relates to certain novel heterocyclic nitro-p-phenylenediamines.

The nitro-p-phenylenediamines have been found to be useful as dyes, particularly in the dyeing of human hair. This is illustrated, inter alia, by reference to U.S. Pats. 2,750,327; 3,088,978; 3,168,442; 3,088,877; 3,119,867; 3,088,878 and 3,274,249 which describe a variety of nitro-p-phenylenediamines and their use in dyeing human hair.

A number of processes are known in the prior art for preparing compounds of this series. However, they all leave something to be desired. Thus, for example, it has been proposed to prepare the nitro-p-phenylenediamines by the nitration of certain p-phenylenediamines. This procedure required the previous blocking of the H atoms on the amino N by means of acetylation, formylation, oxalylation, tosylation or the preparation of the urethane before the nitration step. It further required a hydrolysis step subsequent to the nitration reaction. This process, obviously, is very complicated and time-consuming and gives low overall yield, and accordingly, is not very useful from a commercial point of view.

Another proposed method utilizes the partial reduction of the dinitrocompound, i.e.,

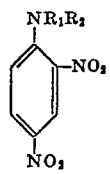

In this method, generally, two isomers are formed and, even when one isomer predominates, the separation is difficult and tedious. Moreover (depending on the reducing agent and reaction conditions), the product of complete reduction is also often formed to some extent, which further complicates the separation of the desired compound.

The reducing agents used in this process have been quite varied and include sulfides or polysulfides of alkali metals, hydrosulfite, stannous chloride, metals in acid, hydrogen in the presence of catalysts (Pt, Pd, Ni). Recently, hydrazine in the presence of a catalyst (Ni, Pd, Pt) and the transfer hydrogenation (cyclohexene in the presence of Pd) have been employed. There is, however, no general rule as to which nitro group is reduced. With many alkaline reductions the o-diamino compound prevails in the reaction mixture; with many catalytic reductions in acid medium, the p-diamino isomer is predominant.

It has now been found unexpectedly that the nitro-p-phenylenediamines of interest may be prepared under relatively mild conditions, in very high yield and in a high state of purity by reacting a 4-fluoro-3-nitroaniline (N-substituted or unsubstituted) with the desired amine.

It is accordingly an object of the present invention to provide a process for preparing certain heterocyclic nitro-p-phenylenediamines under mild conditions, in high yield and high degree of purity, employing a 4-fluoro-3-nitroaniline (N-substituted or unsubstituted).

It is a further object of this invention to provide certain novel heterocyclic nitro-p-phenylenediamines.

Other and more detailed objects will be apparent from the following description and claim.

The principal process employed in the present invention can be described by the following equation:

(I) 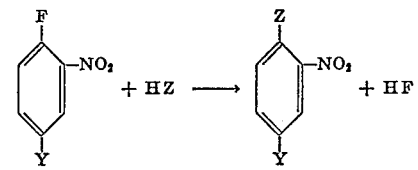

wherein HZ is a heterocyclic amine and wherein:

(a) $Y$ is $-N\begin{matrix}R_1\\R_2\end{matrix}$ or $-N\begin{matrix}\ \\R_3\end{matrix}$ and $Z$ is $-N\begin{matrix}\ \\R_3\end{matrix}$ in which $R_1$ and $R_2$ might be identical or different and represent H, monovalent aliphatic, aryl, aralkyl, cycloalkyl radicals and $R_3$ is a divalent aliphatic radical.

All the compounds made by the process described in equation I above are useful as dyes, particularly for dyeing human hair. In addition, many are suitable as dye intermediates, pharmaceuticals, preparative organics or dyes for special purposes.

When $R_1$ and/or $R_2$ in Equation I above is a monovalent aliphatic radical, it may take a variety of forms. Thus, it may be a straight-chain or branched-chain alkyl group; a monohydroxy or polyhydroxy (e.g., dihydroxy, trihydroxy) alkyl group; or a group like —CO—alkyl, —CO—hydroxyalkyl, —COO—alkyl, —CON(alkyl)$_2$, —CONH$_2$, —CSNH$_2$, —CN, —CH$_2$CONH$_2$, —SO$_2$—alkyl, —SO$_2$—aryl or a substituted alkyl group of the form —alkylene—M in which M may be —COOH, —CONH$_2$, —CO—alkyl, —CO—hydroxyalkyl, —SO$_3$H, —SO$_2$NH$_2$, —SO$_2$NH—alkyl, —SO$_2$—NH—hydroxyalkyl, —SO$_2$N(alkyl)$_2$, —SO$_2$N$\begin{matrix}\text{alkyl}\\\text{hydroxyalkyl}\end{matrix}$ —SO$_2$N—(hydroxyalkyl)$_2$, —SO$_2$—alkyl, —NH$_2$, —NH—alkyl, —N(alkyl)$_2$, —N(alkyl)$_3$+Cl⁻, —(NH—alkylene)$_n$NH$_2$ or —(NH—alkylene)$_n$OH, in which n is a number from 1 to 3, —NHCO—alkyl, —NHCO—hydroxyalkyl, —NHCO—aryl, —NHCONH$_2$, —NHCSNH$_2$, —NHCOO—alkyl, —NHSO$_2$—alkyl, —NHSO$_2$—aryl, —O—alkyl, —O—alkylene—OH, —CN.

In the preferred form of this invention, the alkyl or the alkylene moieties above per se or in the hydroxyalkyl radical contain from 1 to 6 and particularly from 1 to 3 carbon atoms.

Typical among the monovalent aliphatic radicals which represent $R_1$ or $R_2$ in equation I above there can be mentioned: methyl, ethyl, n-propyl, isopropyl, n-butyl, sec. butyl, tert. butyl, n-amyl, isoamyl, n-hexyl, 2-hydroxyethyl, 3-hydroxypropyl, 2-hydroxypropyl, tris(hydroxymethyl)methyl; 1,3-dihydroxy-2-methyl-2-propyl; 2,3-dihydroxypropyl; 1,3-dihydroxy-2-propyl; 2-diethylaminoethyl; aminopropylaminopropyl, methoxyethyl, ethoxyethyl, acetamidoethyl, propionamidoethyl, aminoethyl, aminopropyl, glycolamidopropyl, methylsulfonamidoethyl, propylsulfonamidopropyl, ureidopropyl, ureidoethyl, thioureidoethyl, carbethoxyaminoethyl, sulfamoylethyl, (2-hydroxyethylsulfamoyl)ethyl, dimethylsulfamoylethyl, cyanomethyl, acetyl, formyl, tosyl, cyanoethyl, di-alkylcarbamoyl, carboxymethyl, etc.

When $R_1$ and/or $R_2$ in Equation I above is aryl, it ordinarily will be a monocyclic or a bicyclic aryl radical having up to 10 carbon atoms in the ring system. These usually will take the form of substituted and unsubstituted phenyl or naphthyl radicals. The aryl-substituted radicals can contain any of a variety of substituents or combinations thereof. By way of illustration, the following may be mentioned: alkyl, alkenyl, hydroxy, alkoxy, halogen, nitro, amino, alkylamino, dialkylamino, hydroxyalkylamino, carboxy, carbamoyl, carbalkoxy, cyano, mercapto, alkylthio, etc.

When $R_1$ and/or $R_2$ in Equation I above is an aralkyl radical, it will be similar in structure to that described above for the aryl radicals, excepting that the bonding to the amine nitrogen will be through the alkyl moiety of the aralkyl radical.

$R_3$ in Equation I above is a divalent radical which together with the N atom forms a heterocyclic ring structure. $R_3$ may be a hydrocarbon radical or it may be an ether linked or N-linked hydrocarbon radical. Ordinarily, the ring system comprising $R_3$ and N will not contain more than 6 atoms (and usually will contain 5 or 6 atoms), and may be substituted or unsubstituted. By way of illustration it may be mentioned that the group

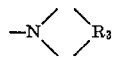

may be substituted or unsubstituted N-pyrrolidinyl, N-morpholinyl, N-piperazinyl, or N-piperidinyl radicals in which the substituents may be alkyl, halogen, alkoxy etc.

When $R_1$ and/or $R_2$ above is cycloalkyl, it will ordinarily not exceed 6 carbon atoms and usually will contain 5 or 6 carbon atoms.

The principal process of the present invention involves the nucleophilic displacement of the fluorine atom by an amine or ammonia in the compound of the formula:

(II)

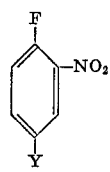

in which Y has thhe same value ascribed to it above in connection with Equation I, under mild conditions and in good yields. This was indeed quite unexpected since the displacement of the other halogen atoms, such as chlorine, bromine or iodine, with amines is known to be very difficult. It is known that the presence of the Y group in the 1 position of the benzene ring (see Formula II) deactivates a chlorine, bromine or iodine which would be present in the 4 position, so that displacement of these halogens by an amine is very difficult. Thus, very high temperature (e.g., 100 to 200° C.) and high pressures (sealed tube or autoclave) must be used and even then the yields are very poor and are accompanied by resin formation and difficulties in the separation procedures. This deactivation effect is known in this art and is sometimes referred to as the +T effect. It was unexpected that the use of the corresponding fluorine compounds would so greatly facilitate the introduction of a second amino group into the 4-position.

The principal process of this invention involves condensing the amine or ammonia and the fluorine reactant under mild conditions. This will be effected at a temperature of no higher than about 100° C. and usually at the reflux temperature. Furthermore, the reaction will ordinarily not be carried out at a pressure that is above 100 p.s.i., and for the most part, only at atmospheric pressure. The process will proceed in any suitable solvent, usually water or aqueous alcohol being adequate. The use of dipolar aprotic solvents (DMT, DMSO, acetonitrile) is not necessary, although they may be included in some cases to speed up the rate of reaction.

The present method of preparation has several advantages over the prior art procedures:

(a) only one isomer is formed by displacement of fluorine;
(b) yields are very high and in most cases about quantitive;
(c) only mild conditions for the reaction are necessary;
(d) inexpensive solvents can be used as the reaction medium;
(e) expensive catalysts (Pt, Pd), which are used in some prior art processes, are eliminated. This is important since in a large scale production, they constitute the major item in the cost of the product;
(f) purity of the product is enhanced; and
(g) working up of the reaction mixture is simplified.

The fluorine intermediates having the General Formula II, shown above can be prepared by the nitration of the appropriate p-fluoroaniline (i.e., N-substituted or unsubstituted) and may be described generally by the following:

(III)

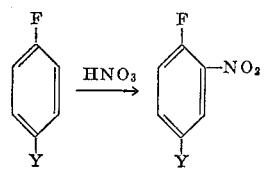

wherein Y has the same significance ascribed to it in connection with Equation I above. In a preferred method for preparing the 4-fluoro-3-nitro-anilines involved in the present invention, the nitrating agent comprises a mixture of sulfuric and nitric acid, and the reaction is carried out at low temperatures (e.g., 3–5° C.).

As an alternative procedure for synthesizing the substituted compounds of Formula II above, 4-fluoro-3-nitroaniline is first prepared by nitrating p-fluoraniline. The 4-fluoro-3-nitroaniline so made is then reacted with an appropriate alkylating agent, e.g., alkyl or hydroxyalkyl compounds, alkylene oxides, alkyl sulfates, alkyl iodides, alkyl tosylates, alkylene chlorohydrin, or other appropriate reagents which will replace H bonded to the amine nitrogen in the 1 position. In this fashion one or both of the H atoms of the amine N may be replaced by the substituent $R_1$ or $R_2$ described above.

It is a principal feature of the present invention to provide a novel group of heterocyclic nitro-p-phenylenediamines, which are useful in dyeing human hair. This group is described by the formula:

(V)

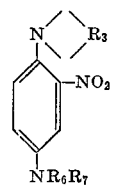

wherein:

(a) $R_3$ is a divalent aliphatic radical having the same value as the $R_3$ defined above in connection with Equation I; and (b) $R_6$ and $R_7$ are selected from the group consisting of hydrogen, alkyl and hydroxyalkyl; at least one of $R_6$ and $R_7$ being other than hydrogen. When $R_6$ and $R_7$ are alkyl or hydroxyalkyl, they will have the corresponding values ascribed to $R_1$ and $R_2$ above in connection with Equation I.

The compounds defined in Formula V above may be incorporated in similar hair dye compositions as those described in the aforesaid U.S. patents. A typical composition in which the dyes of Formula V above may be employed is prepared as follows:

A mixture defined below is diluted with 5.0 ml. water, and the whole heated at 60° C. for one hour:

|  | G. |
|---|---|
| Dye | 0.25 |
| Ethanol | 0.35 |
| Ethanolamine | 4.0 |
| Sodium N-methyl - N - oleoyl-taurate (Igepon T-33) | 0.5 |
| Sodium carboxymethylcellulose | 3.0 |

This mixture was then further diluted with water to a volume of 100 ml. and citric acid is added to give a pH of 9.9.

To dye hair, the dye compositions so obtained are poured on natural gray hair, permanent-waved hair or bleached hair and allowed to remain in contact therewith for 20 minutes at 30° C. The hair is then rinsed in clear water and dried in air.

The following examples are further illustrative of the present invention. It should be understood, however, that the invention is not limited thereto.

EXAMPLE 1A

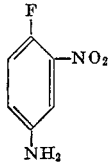

Preparation of 4-fluoro-3-nitroaniline

This process is a modification of the Holleman and Beckman procedure (Rec. trav. chim, vol. 23 (1904), p. 237) by which there is obtained higher yields of recrystallized product. The procedure is as follows:

To a solution of 139 g. of p-fluoroaniline in 1390 g. of $H_2SO_4$, 100%, a mixture of 81.3 g. $HNO_3$, 100%, in 810 g. $H_2SO_4$, 100%, is added at 3–5° C. After one hour the mixture is poured on ice, neutralized with conc. ammonia, cooled. The solid obtained is filtered off, and recrystallized from boiling water. After cooling to 10° C., yellow-brown crystals are filtered off and dried.

Yield: 120 g. (=62% theory), M.P. 94 to 96° C. (uncorr.).

EXAMPLE 1B

Preparation of 4-fluoro-3-nitroaniline

To a solution of 139 g. of p-fluoroaniline in 834 g. of $H_2SO_4$, 100%, a mixture of 81.3 g. of $HNO_3$, 100%, in 489 g. $H_2SO_4$, 100%, is slowly added at 8–10° C. One hour after this addition, the mixture is poured on 800 g. of ice and the resulting solution made alkaline with 2300 ml. of conc. aqua ammonia. On cooling to approximately 5° C., the orange crude product is filtered off, sharply sucked off, and stirred with 600 ml .of water and 120 ml. of conc. HCl at room temperature. The insoluble, dark-brown solid is filtered off, the filtrate made alkaline with 82 g. of solid sodium carbonate, and the solid filtered off and dried in vacuo at 60–70° C. or in the air.

Yield: 143 g., light orange crystals (=73% theory), M.P. 95–96° C.

EXAMPLE 2

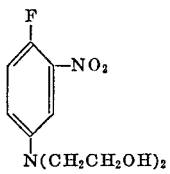

Preparation of 4-fluoro-3-nitro-N,N-bis(hydroxyethyl)-aniline 78 g. of 4-fluoro-3-nitro-aniline is suspended in 250 ml. water and a stream of ethylene oxide is bubbled through at 70 to 80° C. until the starting amine and the intermediate monohydroxyethyl derivative have disappeared. On cooling to 10° C. light yellow crystals separate out, which are filtered off, washed slightly with water, and dried.

Yield: 112.5 g. (=92.1% theory), M.P. 109–110° C. (uncorr.).

EXAMPLE 3

Preparation of 1-(4-amino-2-nitrophenyl)pyrrolidine

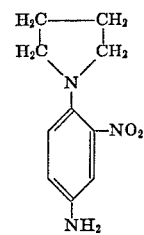

A mixture of:

| 4-fluoro-3-nitroaniline | g | 6.24 |
|---|---|---|
| Pyrrolidine | g | 11.36 |
| Ethanol-water (1:1) | ml | 100 | was maintained at reflux for 1½ hours. Ethanol was then evaporated, and a crude product isolated by cooling the mixture (8.0 g.=97% of theoretical, M.P. 91.5–95° C.). On recrystallization from ethanol 5.0 g. of dark metallic crystals, M.P. 91.5–95° C. was obtained.

EXAMPLE 4

Preparation of N-(4-amino-2-nitrophenyl)morpholine

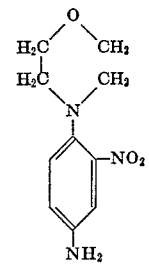

A mixture of:

| 4-fluoro-3-nitroaniline | g | 7.8 |
|---|---|---|
| Morpholine | g | 21.8 |
| Water | ml | 250 | was maintained at reflux for 8 hours. The mixture was allowed to cool, whereby large orange needles separated, which were filtered off and dried.

Yield: 10.7 g. light orange crystals (=96% theoretical), M.P. 133–135° C., chromatographically pure. Saunders, J. Chem. Soc., 1955, 3286 (prepared by partial reduction of dinitro compound) reports M.P. 133–135° C.

EXAMPLE 5

Preparation of 1-(4-amino-2-nitrophenyl)piperidine

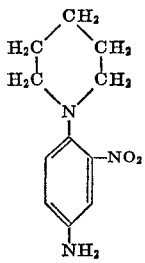

A mixture of

| 4-fluoro-3-nitroaniline | g__ | 7.8 |
| --- | --- | --- |
| Piperidine | g__ | 21.0 |
| Water | ml__ | 250 | was maintained at reflux for 8 hours. The mixture was allowed to cool, and fine crystals were filtered off, and dried.

Yield: 10.5 g. of dark violet crystals (=91% theroretical), M.P. 114–116° C., Saunders, J. Chem. Soc., 1955, 3279 prep. by partial reduction of dinitro compound) found M.P. 116° C. (recryst. from ligroine).

EXAMPLE 6

Preparation of 1-[4-bis(2-hydroxyethyl)amino-2-nitrophenyl]pyrrolidine

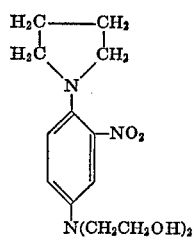

A mixture of:

| 4-fluoro-3-nitro-N,N-bis(2-hydroxyethyl) aniline | g__ | 9.76 |
| --- | --- | --- |
| Pyrrolidine | g__ | 8.52 |
| Ethanol-water (1:1) | ml__ | 100 | was maintained at reflux for 2½ hours. Ethanol was then distilled off, some sodium chloride added, and after cooling in refrigerator, crystals separated, which were dried in desiccator.

Yield: 12.0 g. of purple needles (nearly quantitative yield), M.P. 74–76° C., chromatographically pure.

EXAMPLE 7

Preparation of N-[4-bis(2-hydroxyethyl)amino-2-nitrophenyl]morpholine

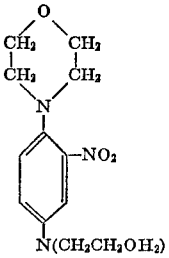

A mixture of:

| 4-fluoro-3-nitro-N,N-bis(2-hydroxyethyl) aniline | g__ | 9.76 |
| --- | --- | --- |
| Morpholine | g__ | 17.4 |
| Water | ml__ | 150 | was maintained at reflux for 8 hours, the whole extracted with chloroform, and on evaporating on steam bath, a dark oil resulted. This was shaken with 50 ml. of warm water and the water decanted. This operation was repeated several times until all morpholine was removed. A brown oil was obtained which after drying finally solidified after standing several days.

Yield: 4.9 g. of red-brown, microcrystalline product (=40% theoretical), M.P. 66–68° C., chromatographically pure.

EXAMPLE 8

Preparation of 1-[4-bis(2-hydroxyethyl)amino-2-nitrophenyl]piperidine

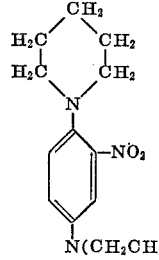

A mixture of:

| 4-fluoro-3-nitro-N,N-bis(2-hydroxyethyl) aniline | g__ | 97.6 |
| --- | --- | --- |
| Piperidine | g__ | 16.8 |
| Water | ml__ | 150 | was maintained at reflux for 8 hours and aqueous layer decanted from the oil. The latter was shaken with 50 ml. of warm water, and the water then decanted. This was repeated several times until all piperidine was removed. After drying and standing, the oil crystallized out.

Yield: 10.0 g. of orange-brown crystals (=81% theoretical), M.P. 82–83° C., chromatographically pure.

What is claimed is:
1. The compound 1-[4-bis(2-hydroxyethyl)amino - 2-nitrophenyl]pyrrolidine.

References Cited

Berliner et al., J.A.C.S., vol. 74, 1574–79, (1952).
Harald Suhr, Chemical Abstracts, vol. 60, p. 13109, (1964).

ALEX MAZEL, Primary Examiner

J. TOVAR, Assistant Examiner

U.S. Cl. X.R.

260—247.5 R, 293.78, 326.85, 556 R, 562 A, 577; 424—274